(12) United States Patent
Ramasamy et al.

(10) Patent No.: US 10,865,620 B1
(45) Date of Patent: Dec. 15, 2020

(54) DOWNHOLE ULTRAVIOLET SYSTEM FOR MITIGATING LOST CIRCULATION

(71) Applicant: Saudi Arabian Oil Company, Dhahran (SA)

(72) Inventors: Jothibasu Ramasamy, Dhahran (SA); Chinthaka Pasan Gooneratne, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 16/720,982

(22) Filed: Dec. 19, 2019

(51) Int. Cl.
*E21B 33/138* (2006.01)
*E21B 41/00* (2006.01)
*E21B 21/00* (2006.01)

(52) U.S. Cl.
CPC .......... *E21B 33/138* (2013.01); *E21B 21/003* (2013.01); *E21B 41/00* (2013.01)

(58) Field of Classification Search
CPC .............................. E21B 33/138; E21B 41/00
USPC ....................................................... 166/295
See application file for complete search history.

(56) References Cited

U.S. PATENT DOCUMENTS

| 4,760,882 | A | 8/1988 | Novak |
| 7,273,102 | B2 | 9/2007 | Sheffield |
| 7,503,398 | B2 | 3/2009 | Logiudice et al. |
| 7,510,001 | B2 | 3/2009 | Spring et al. |
| 7,931,091 | B2 | 4/2011 | Bailey et al. |
| 8,016,036 | B2 | 9/2011 | Kirkwood et al. |
| 8,122,950 | B2 | 2/2012 | Daniel et al. |
| 8,215,393 | B2 | 7/2012 | MacKay et al. |
| 8,284,075 | B2 | 10/2012 | Fincher et al. |
| 8,394,464 | B2 | 3/2013 | Bailey et al. |
| 8,639,186 | B2 | 1/2014 | Ayers |
| 8,800,880 | B2 | 8/2014 | Christiansen |
| 9,115,573 | B2 | 8/2015 | Purkis et al. |
| 9,382,769 | B2 | 7/2016 | Wilson et al. |
| 9,488,046 | B2 | 11/2016 | Purkis |
| 9,506,326 | B2 | 11/2016 | Hay et al. |
| 9,567,819 | B2 | 2/2017 | Cavender et al. |

(Continued)

FOREIGN PATENT DOCUMENTS

| CA | 2894558 A1 | 8/2014 |
| CA | 2929482 A1 | 6/2015 |

(Continued)

*Primary Examiner* — Zakiya W Bates
*Assistant Examiner* — Ashish K Varma
(74) *Attorney, Agent, or Firm* — Bracewell LLP; Constance G. Rhebergen; Linda L. Morgan

(57) ABSTRACT

Method and systems for sealing a lost circulation zone of a subterranean well include extending a drill string into the subterranean well, the drill string having an ultraviolet system, an actuator, and a fluid flow path. The actuator is instructed to transmit an on signal to the ultraviolet system to switch the ultraviolet system to an on condition. In the on condition the ultraviolet system generates ultraviolet light directed towards the fluid flow path of the drill string. A loss circulation material is delivered into the fluid flow path of the drill string, the loss circulation material having an oligomer, a monomer, and a photo-initiator. The loss circulation material is exposed to the ultraviolet light to activate the loss circulation material. The loss circulation material is delivered to the lost circulation zone.

18 Claims, 8 Drawing Sheets

(56) References Cited

U.S. PATENT DOCUMENTS

| | | |
|---|---|---|
| 9,677,371 B2 | 6/2017 | Richards et al. |
| 9,822,611 B2 | 11/2017 | Delzell et al. |
| 9,890,319 B2 | 2/2018 | Ezell et al. |
| 9,970,246 B2 | 5/2018 | Price Hoelscher et al. |
| 10,000,681 B2 | 6/2018 | Livanec et al. |
| 10,047,604 B2 | 8/2018 | Graves et al. |
| 10,053,978 B2 | 8/2018 | Hay et al. |
| 2010/0263867 A1 | 10/2010 | Horton et al. |
| 2011/0048697 A1 | 3/2011 | Lewis et al. |
| 2011/0284245 A1 | 11/2011 | Crandall et al. |
| 2013/0126164 A1 | 5/2013 | Sweatman et al. |
| 2013/0284518 A1* | 10/2013 | Wu .............. C09K 8/035 175/65 |
| 2015/0114646 A1* | 4/2015 | Price Hoelscher ... E21B 33/138 166/302 |
| 2016/0053572 A1 | 2/2016 | Snoswell |
| 2017/0015887 A1 | 1/2017 | De Stefano et al. |
| 2017/0159363 A1 | 6/2017 | Lazarev et al. |
| 2017/0183938 A1 | 6/2017 | Inglis |
| 2017/0247607 A1 | 8/2017 | Hundt |
| 2017/0292371 A1 | 10/2017 | Hay |
| 2017/0293044 A1 | 10/2017 | Gilstrap et al. |
| 2017/0322341 A1 | 11/2017 | Galliano et al. |
| 2017/0342826 A1 | 11/2017 | Wilson et al. |
| 2018/0030824 A1 | 2/2018 | Roberson et al. |
| 2018/0051700 A1 | 2/2018 | Sheth et al. |
| 2018/0082090 A1 | 3/2018 | Roberson et al. |
| 2019/0031951 A1 | 1/2019 | Johnson et al. |
| 2019/0093459 A1 | 3/2019 | Mau et al. |

FOREIGN PATENT DOCUMENTS

| | | |
|---|---|---|
| DE | 60305190 T2 | 11/2006 |
| WO | 2012154473 A1 | 11/2012 |
| WO | 2015040241 | 3/2015 |
| WO | 2016043979 A1 | 3/2016 |

* cited by examiner

DOWNHOLE ULTRAVIOLET SYSTEM FOR MITIGATING LOST CIRCULATION

BACKGROUND

1. Field of the Disclosure

The present disclosure relates in general to subterranean well developments, and more particularly to sealing a zone of a subterranean well for mitigating lost circulation.

2. Description of the Related Art

During the drilling of subterranean wells, such as subterranean wells used in hydrocarbon development operations, drilling mud and other fluids can be pumped into the well. In certain drilling operations, the bore of the subterranean well can reach or pass through a zone that has induced or natural fractures, are cavernous, or otherwise have a high permeability, and which is known as a lost circulation zone. In addition, wellbore stability issues can occur while drilling in any well and can include hole collapse, or fractures leading to a lost circulation. These issues can be due to weak formations, permeable rocks, or fractures that occurs naturally or are induced while drilling.

In such a case, the drilling mud and other fluids that are pumped into the well can flow into the lost circulation zone. In such cases all, or a portion of the drilling mud and other fluids can be lost in the lost circulation zone.

Lost circulation can be encountered during any stage of hydrocarbon development operations. Lost circulation can be identified when drilling fluid that is pumped into the subterranean well returns partially or does not return at all to the surface. While some fluid loss is expected, excessive fluid loss is not desirable from a safety, an economical, or an environmental point of view. Lost circulation can result in difficulties with well control, borehole instability, pipe sticking, unsuccessful production tests, poor hydrocarbon production after well completion, and formation damage due to plugging of pores and pore throats by mud particles. In extreme cases, lost circulation problems may force abandonment of a well.

Sealing these problematic zones is important before continuing to drill the rest of the well. If the problem zone is not sealed or supported, the wellbore wall can collapse and cause the drill string to get stuck, or the drilling mud can become lost in the formation.

In some currently available systems, when unacceptable drilling fluid losses are encountered, conventional lost circulation technologies can be deployed into the drilling fluid from a terranean surface. The drilling fluid, which includes loss mitigation chemicals, is pumped downhole as part of the standard well circulation system. The modified drilling fluid passes through the bottom hole assembly (BHA), including a drill bit, or bypasses the BHA through a circulation port and is ultimately designed to plug lost circulation zone. As an example, the modified drilling fluid can seal the exposed formation at a location in the wellbore in which losses are occurring. Once sealing of the wellbore has occurred and acceptable fluid loss control is established, drilling operations may resume.

SUMMARY OF THE DISCLOSURE

Conventional loss circulation material (LCM) may seal uniformly shaped formation voids with an opening size, for example, of up to approximately 4-6 millimeters (mm) but struggle with un-uniform and larger voids. In some current systems activators can be used to harden a LCM. Such activators can be stimulated, for example, by temperature, pH, or over time alone. However, it can be difficult to predict the exact temperature and pH at the location of the loss zone, and the time required to reach and fill the loss zone can change due to unexpected events while delivering the LCM to the loss zone. If the LCM hardens before reaching the loss circulation zone, the entire downhole assembly could become plugged and require replacement. Alternately, if the required temperature or pH is not reached, the LCM may not harden.

Embodiments of this disclosure include systems and methods that include an LCM that has oligomers, monomers and photo-initiators. An ultraviolet source is assembled adjacent to the drilling bit. When severe losses occur, the LCM containing the oligomer, monomer, and photo-initiator could be pumped down from the surface. Photo-initiators are sensitive to ultraviolet light and as the LCM passes through the illuminating ultraviolet source, the photo-initiator gets activated to generate free-radicals. These free radicals trigger the monomer to undergo a cross-linking or polymerization reaction with oligomer. Therefore, the whole LCM which is in a flow-able state before irradiation by the ultraviolet light starts to harden and set. The hardened material can possess sufficient compressive strength to be able withhold the overburden pressure. A downhole actuator is used to turn on and off the ultraviolet light source wherever necessary by sending signal to the power source in the ultraviolet light source system.

In an embodiment of this disclosure, a method for sealing a lost circulation zone of a subterranean well includes extending a drill string into the subterranean well. The drill string has an ultraviolet system, an actuator, and a fluid flow path. The actuator is instructed to transmit an on signal to the ultraviolet system to switch the ultraviolet system to an on condition. In the on condition the ultraviolet system generates ultraviolet light directed towards the fluid flow path of the drill string. A loss circulation material is delivered into the fluid flow path of the drill string, the loss circulation material having an oligomer, a monomer, and a photo-initiator. The loss circulation material is exposed to the ultraviolet light to activate the loss circulation material. The loss circulation material is delivered to the lost circulation zone.

In alternate embodiments, instructing the actuator to transmit the on signal to the ultraviolet system to switch the ultraviolet system to the on condition can include rotating the drill string in a predetermined on signal pattern. After exposing the loss circulation material to the ultraviolet light, the actuator can be instructed to transmit an off signal to the ultraviolet system to switch the ultraviolet system to an off condition by rotating the drill string in a predetermined off signal pattern.

In other alternate embodiments, the photo-initiator can be a benzyl dimethyl acetal, and exposure to the ultraviolet irradiation by the ultraviolet system can cause the benzyl dimethyl acetal to generate a free radical. The oligomer can be a polyacrylate and the monomer can be a styrene. Exposure to the ultraviolet irradiation by the ultraviolet system can trigger a polymerization reaction of the styrene and the polyacrylate. A cross-linked polymer can be formed within the lost circulation zone and drilling of the subterranean well can be ceased until the cross-linked polymer has hardened and set within the lost circulation zone. After the cross-linked polymer has hardened and set within the lost circulation zone, drilling of the subterranean well can be resumed, and drilling can occur from a position uphole of the lost circulation zone to a position downhole of the lost circulation zone.

In yet other alternate embodiments, the oligomer can be a resin that is an unsaturated polyester resin, acrylated epoxy resin, acrylated polyurethane epoxy resin, acrylated styrene resin, and acrylated ether resin. The ultraviolet system can include a light emitting diode type ultraviolet light source. The actuator can be a tubular actuator assembly, and the method can include securing the tubular actuator assembly to a downhole end of a joint of the drill string. The ultraviolet system can be a tubular ultraviolet assembly that is located downhole of the tubular actuator assembly, and the method can further include securing a drill bit assembly to a downhole side of the tubular ultraviolet assembly.

In still another alternate embodiment, the actuator can be a tubular actuator assembly having an internal pipe member with a segment formed of a first material. An external pipe member can circumscribe the internal pipe member. A bearing can be positioned between the internal pipe member and the external pipe member, the bearing formed of a second material. The first material can be reactive to the second material. Instructing the actuator to transmit the on signal to the ultraviolet system can include rotating the external pipe member relative to the internal pipe member and interpreting a pattern of a reaction of the segment as the bearing rotates past the segment.

In an alternate embodiment of this disclosure, a system for sealing a lost circulation zone of a subterranean well includes a drill string having an ultraviolet system, an actuator, and a fluid flow path. The actuator is operable to transmit an on signal to the ultraviolet system to switch the ultraviolet system to an on condition. In the on condition the ultraviolet system generates ultraviolet light directed towards the fluid flow path of the drill string. The system further includes a loss circulation material for delivery into the fluid flow path of the drill string. The loss circulation material has an oligomer, a monomer, and a photo-initiator operable to be activated upon exposure to an ultraviolet irradiation by the ultraviolet system.

In alternate embodiments, the system can further include a predetermined on signal pattern defined by rotation of the drill string. The predetermined on signal pattern can be operable to instruct the actuator to transmit the on signal to the ultraviolet system to switch the ultraviolet system to the on condition. A predetermined off signal pattern can be defined by rotation of the drill string. The predetermined off signal pattern can be operable to instruct the actuator to transmit an off signal to the ultraviolet system to switch the ultraviolet system to an off condition.

In other alternate embodiments, the photo-initiator can be a benzyl dimethyl acetal that is operable to generate a free radical when exposed to the ultraviolet irradiation by the ultraviolet system. The oligomer can be a polyacrylate and the monomer can be a styrene. Exposure to the ultraviolet irradiation by the ultraviolet system can be operable to trigger a polymerization reaction of the styrene and the polyacrylate.

In still other alternate embodiments, the system can further include a cross-linked polymer set within the lost circulation zone, the cross-linked polymer including the oligomer, and the monomer. The ultraviolet system can include a light emitting diode type ultraviolet light source. The actuator can be a tubular actuator assembly secured to a downhole end of a joint of the drill string. The ultraviolet system can be a tubular ultraviolet assembly that is located downhole of the tubular actuator assembly and a drill bit assembly can be secured to a downhole side of the tubular ultraviolet assembly.

In yet other alternate embodiments, the actuator can be a tubular actuator assembly having an internal pipe member with a segment formed of a first material. An external pipe member can circumscribe the internal pipe member. A bearing can be positioned between the internal pipe member and the external pipe member, the bearing formed of a second material. The first material can be reactive to the second material. A pattern of a reaction of the segment can be defined as the external pipe member is rotated relative the internal pipe member and the bearing rotates past the segment. The pattern of the reaction can be interpretable to instruct the actuator to transmit the on signal to the ultraviolet system.

BRIEF DESCRIPTION OF THE DRAWINGS

So that the manner in which the above-recited features, aspects and advantages of the disclosure, as well as others that will become apparent, are attained and can be understood in detail, a more particular description of the embodiments of the disclosure briefly summarized above may be had by reference to the embodiments thereof that are illustrated in the drawings that form a part of this specification. It is to be noted, however, that the appended drawings illustrate only certain embodiments of the disclosure and are, therefore, not to be considered limiting of the disclosure's scope, for the disclosure may admit to other equally effective embodiments.

DETAILED DESCRIPTION

The Specification, which includes the Summary of Disclosure, Brief Description of the Drawings and the Detailed Description, and the appended Claims refer to particular features (including process or method steps) of the disclosure. Those of skill in the art understand that the disclosure includes all possible combinations and uses of particular features described in the Specification. Those of skill in the art understand that the disclosure is not limited to or by the description of embodiments given in the Specification. The inventive subject matter is not restricted except only in the spirit of the Specification and appended Claims.

Those of skill in the art also understand that the terminology used for describing particular embodiments does not limit the scope or breadth of the disclosure. In interpreting the Specification and appended Claims, all terms should be interpreted in the broadest possible manner consistent with the context of each term. All technical and scientific terms used in the Specification and appended Claims have the same meaning as commonly understood by one of ordinary skill in the art to which this disclosure relates unless defined otherwise.

As used in the Specification and appended Claims, the singular forms "a", "an", and "the" include plural references unless the context clearly indicates otherwise. As used, the words "comprise," "has," "includes", and all other grammatical variations are each intended to have an open, non-limiting meaning that does not exclude additional elements, components or steps. Embodiments of the present disclosure may suitably "comprise", "consist" or "consist essentially of" the limiting features disclosed, and may be practiced in the absence of a limiting feature not disclosed. For example, it can be recognized by those skilled in the art that certain steps can be combined into a single step.

Spatial terms describe the relative position of an object or a group of objects relative to another object or group of objects. The spatial relationships apply along vertical and horizontal axes. Orientation and relational words including "uphole" and "downhole"; "above" and "below" and other like terms are for descriptive convenience and are not limiting unless otherwise indicated.

Where the Specification or the appended Claims provide a range of values, it is understood that the interval encompasses each intervening value between the upper limit and the lower limit as well as the upper limit and the lower limit. The disclosure encompasses and bounds smaller ranges of the interval subject to any specific exclusion provided.

Where reference is made in the Specification and appended Claims to a method comprising two or more defined steps, the defined steps can be carried out in any order or simultaneously except where the context excludes that possibility.

Figure 1:
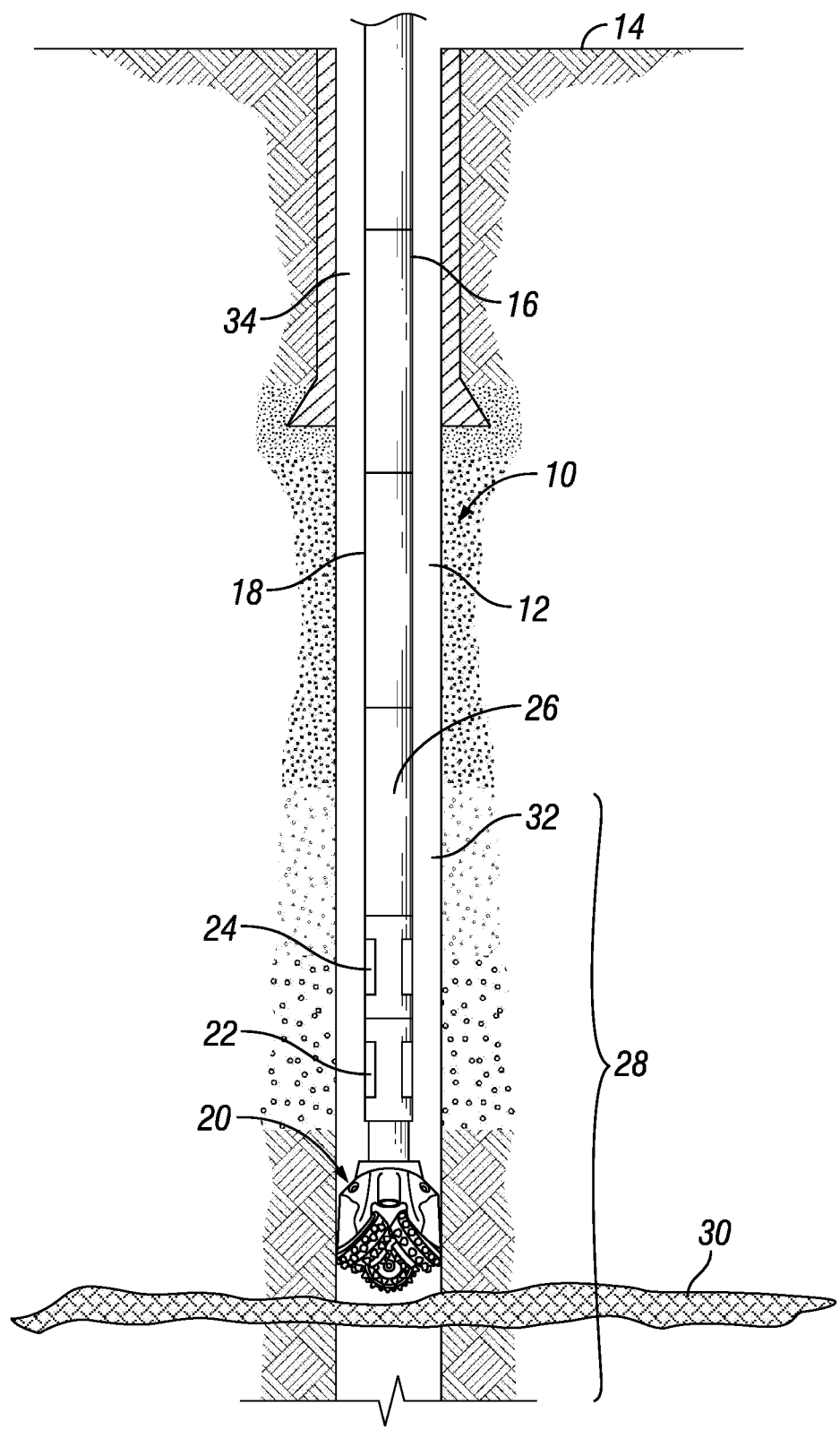
FIG. 1 is a section view of a subterranean well with a system for sealing a lost circulation zone of a subterranean well, in accordance with an embodiment of this disclosure.

Looking at FIG. 1, subterranean well 10 can have wellbore 12 that extends to an earth's surface 14. Subterranean well 10 can be an offshore well or a land based well and can be used for producing hydrocarbons from subterranean hydrocarbon reservoirs, or can be otherwise associated with hydrocarbon development activities.

Drill string 16 can extend into and be located within wellbore 12. Drill string 16 can include tubular member 18 and bottom hole assembly 20. Tubular member 18 can extend from earth's surface 14 into subterranean well 10. Bottom hole assembly 20 can include, for example, drill collars, stabilizers, reamers, shocks, a bit sub and the drill bit. Drill string 16 can be used to drill wellbore 12. In certain embodiments, tubular member 18 is rotated to rotate the bit to drill wellbore 12.

Drill string 16 can further include ultraviolet system 22, actuator 24, and fluid flow path 26. In the example embodiment of FIG. 1, fluid flow path 26 is a central bore of the tubular members that make up drill string 16. Actuator 24 and ultraviolet system 22 are separate systems that can be seamlessly integrated with other downhole tools, devices, and instruments so that actuator 24 and ultraviolet system 22 do not displace existing drilling portfolios.

Wellbore 12 can be drilled from surface 14 and into and through various formation zones 28 of subterranean formations. Formation zones 28 can include layers of reservoir that are production zones, or that are non-production zones. Formation zones 28 can also include a problem zone such as lost circulation zone 30. In embodiments, lost circulation zone 30 can be uphole of or downhole of production zones.

The formation zones 28 can be at an elevation of uncased open hole bore 32 of subterranean well 10. Drill string 16 can pass though cased bore 34 of subterranean well 10 in order to reach uncased open hole bore 32. Alternately, the entire wellbore 12 can be an uncased open hole bore.

Figure 2:
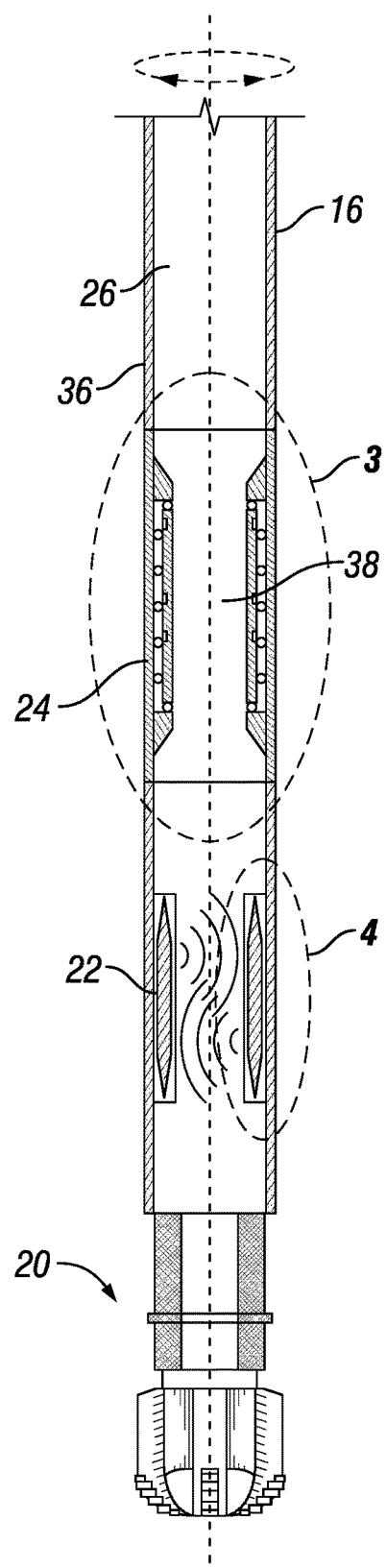
FIG. 2 is a section view of a drill string having an ultraviolet system and an actuator, in accordance with an embodiment of this disclosure.
Figure 3:
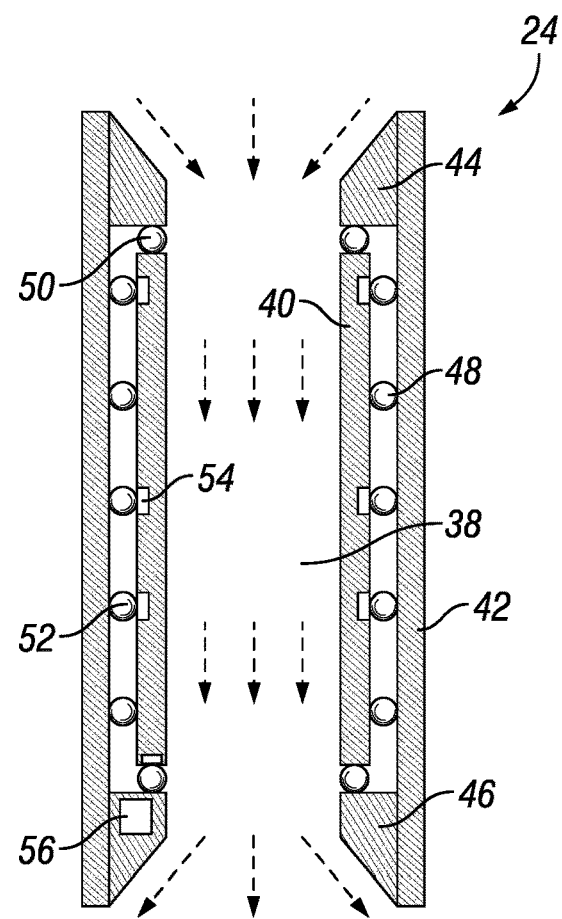
FIG. 3 is section view of an actuator of a system for sealing a lost circulation zone of a subterranean well, in accordance with an embodiment of this disclosure.

Looking at FIGS. 2 and 3, actuator 24 is a tubular actuator assembly. The tubular actuator assembly can be secured to a downhole end of a joint 36 of drill string 16. The actuator assembly can have bore 38 that is aligned with a bore of joint 36 to form a part of fluid flow path 26 of drill string 16.

The tubular actuator assembly can include internal pipe member 40 and external pipe member 42. External pipe member 42 can be secured to the downhole end of a joint 36 of drill string 16. External pipe member 42 can have an outer diameter that is substantially similar or the same as the outer diameter of a joint 36 of drill string 16.

Internal pipe member 40 can be supported within external pipe member 42 so that external pipe member 42 circumscribes internal pipe member 40. Internal pipe member 40 can, for example, be supported within external pipe member 42 between uphole support 44 and downhole support 46. Uphole support 44 and downhole support 46 can extend radially inward from an inner diameter surface of external pipe member 42.

Bearings 48 can be positioned between internal pipe member 40 and external pipe member 42. End bearings 50 can be located between an uphole end of internal pipe member 40 and uphole support 44, and also can be located between a downhole end of internal pipe member 40 and downhole support 46. Side bearings 52 can be located between an outer diameter surface of internal pipe member 40 and an inner diameter surface of external pipe member 42. Bearings 48 can rotate with external pipe member 42 about a central axis of external pipe member 42. As an example, bearings 48 can be retained with external pipe member 42 by conventional bearing retention means.

Internal pipe member 40 includes segments 54. In embodiments, there may be only one segment 54. In alternate embodiments there is an array of segments 54 spaced around a surface of internal pipe member 40. Segments 54 are positioned so that segments 54 are aligned with bearings 48. As an example, segment 54 can be located on an outer diameter surface of internal pipe member 40 and can be axially aligned with a side bearing 52. In alternate embodiments, segment 54 can be positioned at an uphole surface or downhole surface of internal pipe member 40 and can be radially aligned with an end bearing 50.

Segment 54 can be formed of a first material and bearing 48 can be formed of a second material. The first material can be reactive to the second material. In an embodiment of the disclosure, as drill string 16 is rotated external pipe member 42 will rotate relative to internal pipe member 40. As drill string 16 is rotated, external pipe member 42 can rotate with drill string 16 and internal pipe member 40 can remain static. As bearing 48 rotates past segment 54, a reaction of the first material of segments 54 to the second material of bearing 48 can be sensed. As an example, the first material can have an opposite polarity as the second material. Alternately, the first material can be a piezoelectric material and the second material can cause a mechanical stress on the first material.

In order to instruct the actuator to transmit a signal to ultraviolet system 22, drill string 16 can be rotated from the surface so that external pipe member 42 rotates relative to internal pipe member 40 in a predetermined pattern. The pattern can include, for example, a number of turns of drill string 16, a speed or rate of rotation of drill string 16, or a direction of rotation of drill string 16.

The reaction of the first material of segments 54 to the second material of bearing 48 that is sensed as bearing 48 rotates past segment 54 and can be converted to a digital signal for interpretation by an electronics package 56 of tubular actuator assembly. Electronics package 56 can include a digital logic circuit for signal interpretation and can include an actuator system transceiver for signaling ultraviolet system 22 based on the instructions received by way of the predetermined pattern of the rotation of drill string 16.

As an example, one predetermined pattern of rotation of drill string 16 can be an instruction to actuator 24 to send an on signal to ultraviolet system 22 to switch ultraviolet system 22 to an on condition. As another example, another predetermined pattern of rotation of drill string 16 can be an instruction to actuator 24 to send an off signal to ultraviolet system 22 to switch ultraviolet system 22 to an off condition.

Figure 4:
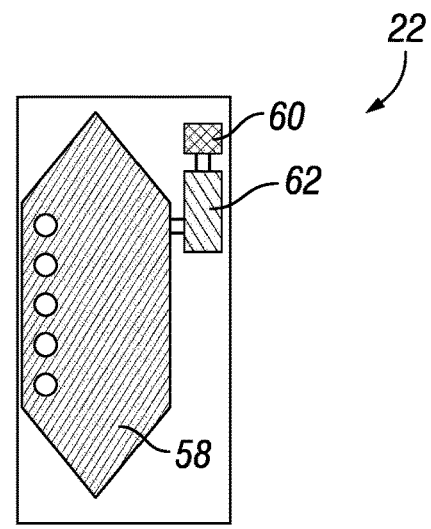
FIG. 4 is section view of an ultraviolet system of a system for sealing a lost circulation zone of a subterranean well, in accordance with an embodiment of this disclosure.

Looking at FIGS. 2 and 4, ultraviolet system 22 is a tubular ultraviolet assembly that is located downhole of the tubular actuator assembly. In the example embodiment of FIG. 2, the tubular ultraviolet assembly is secured to a downhole end of the tubular actuator assembly. In alternate embodiments, the tubular ultraviolet assembly can be spaced apart from ultraviolet system 22 by a joint of drill pipe or by other downhole tools or equipment.

A drill bit assembly can be secured to a downhole side of the tubular ultraviolet assembly. It is desirable to have the tubular ultraviolet assembly proximate to the drill bit, including directly adjacent to the drill bit, so that the loss circulation material passes through the tubular ultraviolet assembly immediately before exiting a downhole end of drill string 16. In this way the chance of loss circulation material becoming hardened within drill string 16 is minimized.

The tubular ultraviolet assembly is an elongated tubular member with a bore that is in fluid communication with bore 38 of tubular actuator assembly and with a bore of drill string 16 to form a part of fluid flow path 26 of drill string 16. The tubular ultraviolet assembly can have an outer tubular member that is secured to a member of drill string 16 that is adjacent to the tubular ultraviolet assembly uphole of the tubular ultraviolet assembly, and to a member of drill string 16 that is adjacent to the tubular ultraviolet assembly downhole of the tubular ultraviolet assembly.

The tubular ultraviolet assembly includes ultraviolet source 58. Ultraviolet source 58 directs ultraviolet light in a direction towards the fluid flow path 26 of drill string 16. In the example embodiments of FIG. 2, ultraviolet source 58 directs ultraviolet light in a direction radially inward towards a central axis of the tubular ultraviolet assembly, which is the fluid flow path of drill string 16.

When ultraviolet system 22 is in the on condition, ultraviolet source 58 is generating ultraviolet light. In an example embodiment, when ultraviolet system 22 is in the on condition an alternating current is applied to ultraviolet source 58, and a selected frequency and wave length of ultraviolet light is created by an ultraviolet lamp. As an example, the ultraviolet light can have a wavelength in a range of 200 nm to 395 nm, the wavelength being dependent on the work to be performed. As an example, ultraviolet system 22 can provide shortwave ultraviolet light with a wavelength of 200 nm to 280 nm for top surface curing. Alternately ultraviolet system 22 can provide medium range wavelength ultraviolet light with a wavelength of 280 nm to 320 nm for mid depth penetration curing. Alternately ultraviolet system 22 can provide longwave ultraviolet light with a wavelength of 320 nm to 395 nm for deeper penetration curing and for cross linking applications. In an example embodiment, ultraviolet system 22 can be a battery powered light emitting diode (LED) type ultraviolet light source. An LED type ultraviolet lamp consumes less power and lasts a longer time compared to conventional ultraviolet lamps. The ultraviolet light source can be used to trigger polymerization or crosslinking reaction of photopolymers used as lost circulation materials. When ultraviolet system 22 is in the off condition, ultraviolet source 58 is not generating ultraviolet light.

Ultraviolet system 22 can further include ultraviolet system transceiver 60. Ultraviolet system transceiver 60 can communicate with electronics package 56 of the tubular actuator assembly. In the example embodiment, ultraviolet system 22 and actuator 24 can communicate wireless by way of ultraviolet system transceiver 60 can communicate with electronics package 56 of the tubular actuator assembly. In alternate embodiments, ultraviolet system 22 and actuator 24 can communicate through a wired connection, such as through a wired drill pipe. An example of communication between ultraviolet system 22 and actuator 24 is actuator 24 sending the on signal to ultraviolet system 22 to switch ultraviolet system 22 to an on condition. Another example of communication between ultraviolet system 22 and actuator 24 is actuator 24 sending the off signal to ultraviolet system 22 to switch ultraviolet system 22 to an off condition.

Ultraviolet system 22 can further include power source 62. Power source 62 can be, for example, a battery. Power source 62 can have sufficient stored power to allow for operation of ultraviolet system 22 over the duration of a drilling operation.

When in the on position, ultraviolet system 22 can direct ultraviolet light towards a loss circulation material that is delivered in the fluid flow path 26 of drill string 16. After passing through ultraviolet system 22, the loss circulation material can be delivered to lost circulation zone 30 (FIG. 1).

Figure 5:
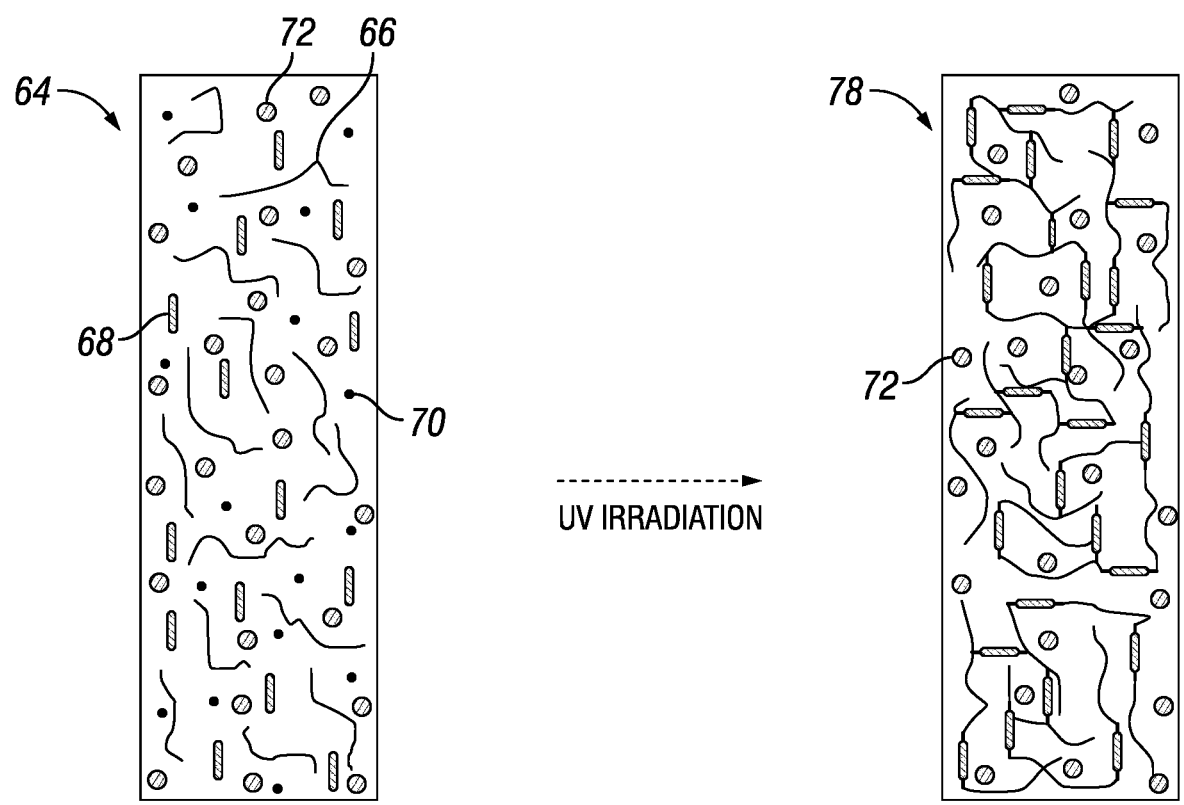
FIG. 5 is a schematic representation of an irradiation of a loss circulation material, and a crosslinking reaction between an oligomer and a monomer of the loss circulation material, in accordance with an embodiment of this disclosure.

Looking at FIG. 5, the loss circulation material 64 can include oligomer 66, monomer 68, and photo-initiator 70. The loss circulation material can include a "responsive" material. As used in this disclosure a "responsive" material is a material that undergoes reversible or irreversible chemical changes in response to an applied external stimulus, such as irradiation by ultraviolet light. As an example, photo-initiators are sensitive to ultraviolet light and generate free radicals upon irradiation by ultraviolet light. The generated free radical will excite the monomer which will either polymerize or cross link the oligomer upon which the loss circulation material becomes thick, will harden, and will eventually set. Fillers 72 can also be used in the loss circulation material to reduce shrinkage due to polymerization. As an example, the filler could be a silica. Alternately, the filler could be barite, calcium carbonate, ilmenite, hematite, or fly ash.

If loss circulation material 64 is not exposed to the ultraviolet light, loss circulation material 64 can remain in its fluid or flowable form indefinitely. This will mitigate the risk of the loss circulation material 64 setting prematurely, such as setting within drill string 16.

Figure 6:
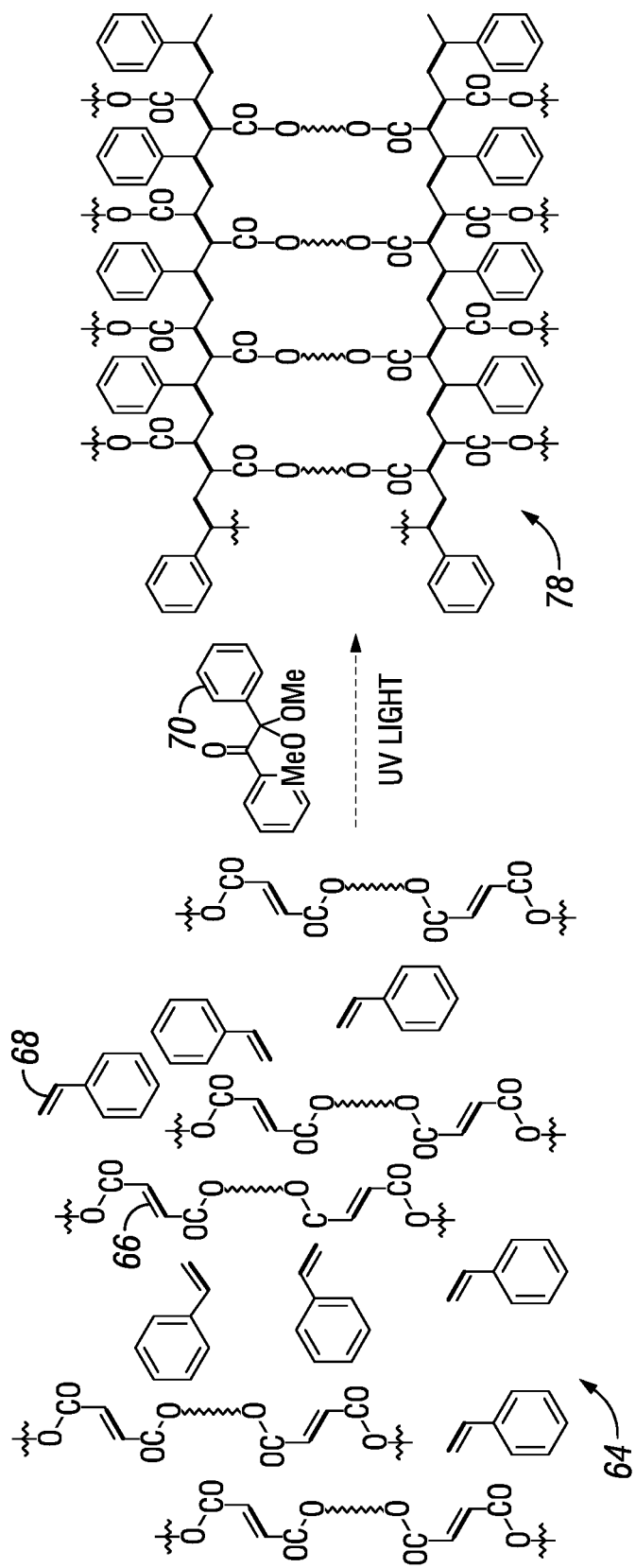
FIG. 6 is an example schematic representation of a reaction of an irradiation of a loss circulation material, in accordance with an embodiment of this disclosure.
Figure 7A:
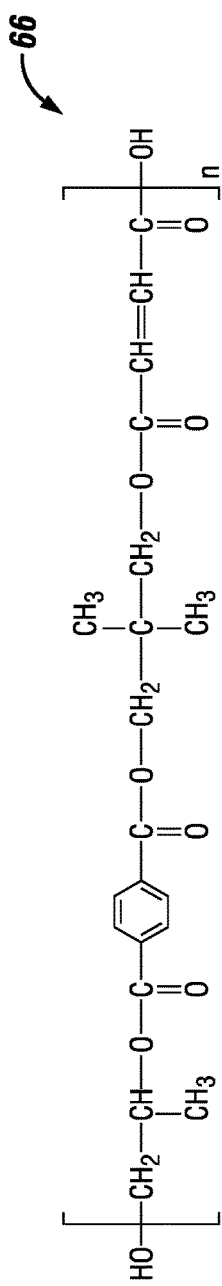
FIGS. 7A-7E are example chemical formulations of example oligomer resins of a loss circulation material, in accordance with an embodiment of this disclosure.
Figure 7B:
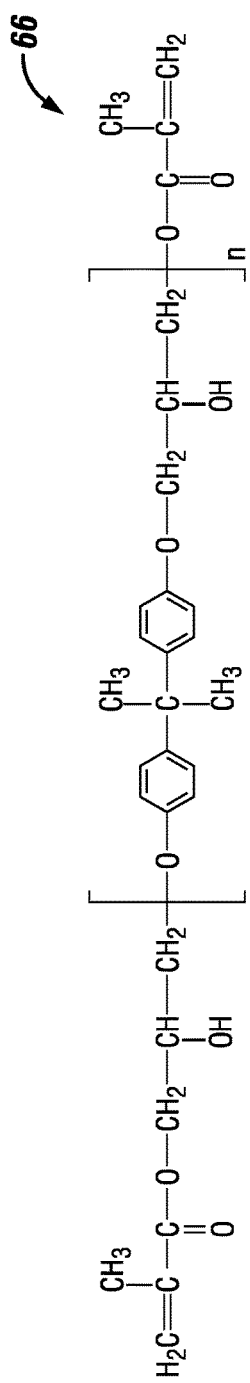
Figure 7C:
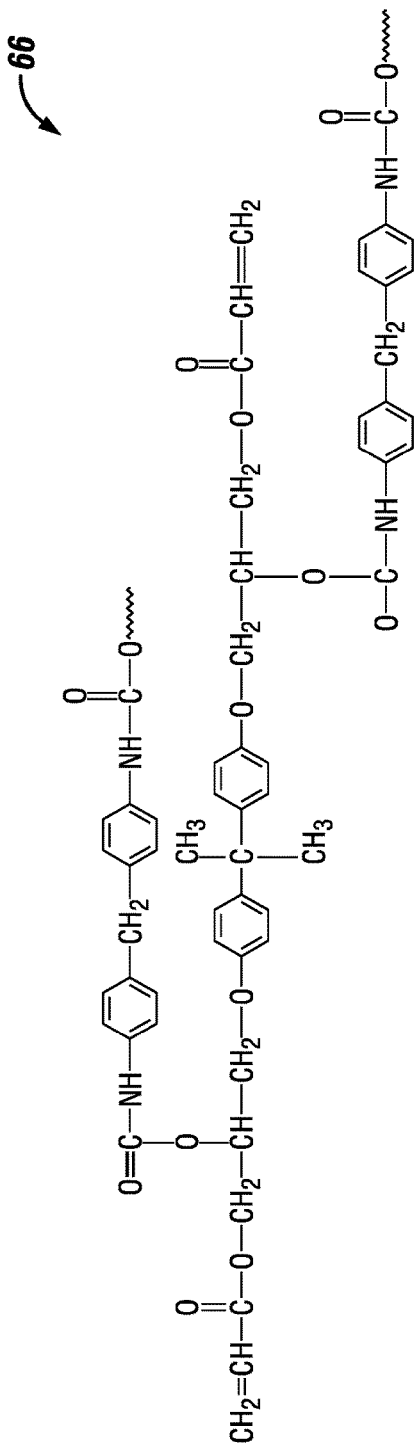
Figure 7D:
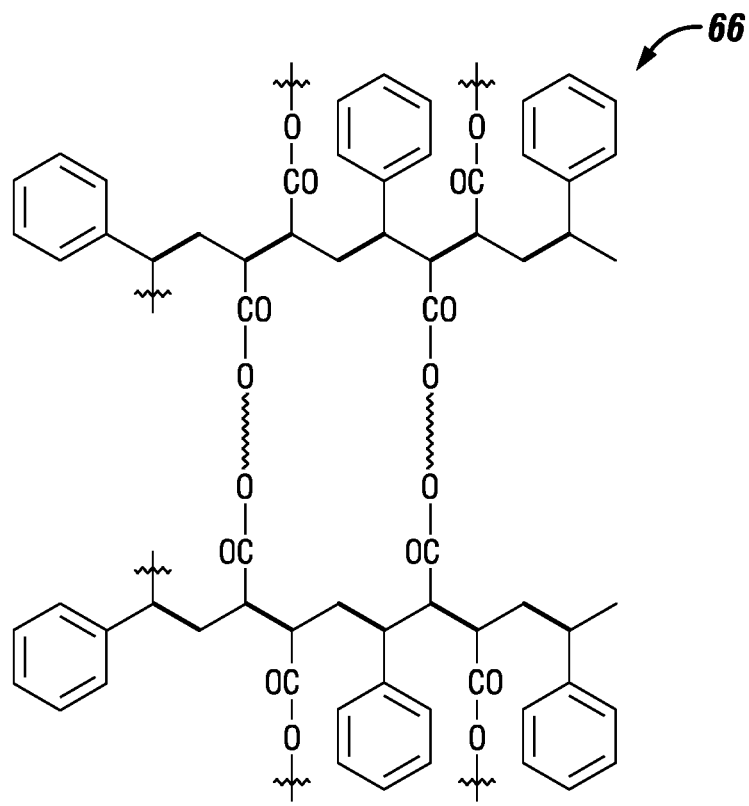
Figure 7E:
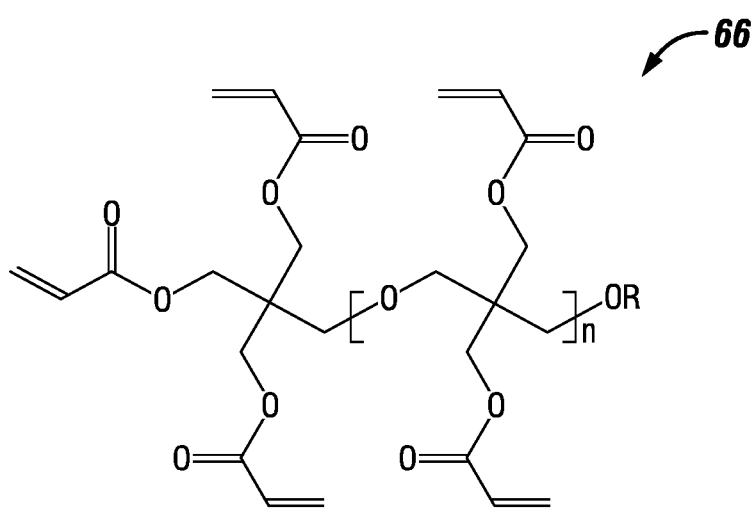

Looking at FIG. 6, in an example embodiment, oligomer 66 is a polyacrylate. In alternate embodiments, oligomer 66 can be a resin. For example, oligomer 68 can be unsaturated polyester resin (FIG. 7A), acrylated epoxy resin (FIG. 7B), acrylated polyurethane epoxy resin (FIG. 7C), acrylated styrene resin (FIG. 7D), or acrylated ether resin (FIG. 7E).

In the example embodiment of FIG. 6, monomer 68 is a styrene. Alternately, monomer 68 can be diethylenetriamine, triethylentetraamine, or tetraethylenepentamine.

Photo-initiators are generally either an ionic or a free radical photo-initiator. The selection of a photo-initiator is typically dependent on the type of polymerization reaction between the monomer and the oligomer. In example embodiments, photo-initiator 70 can be an onium salt, an organometallic compound and pyridinium salt, or a benzophenone, benzyl dimethyl acetal. In the example embodiment of FIG. 6, photo-initiator 70 is a benzyl dimethyl acetal. In the example of FIG. 6, upon ultraviolet irradiation, a free radical is generated by the benzyl dimethyl acetal which triggers the free radical polymerization reaction of styrene and polyacrylates to form cross-linked polymer 78.

Figure 8:
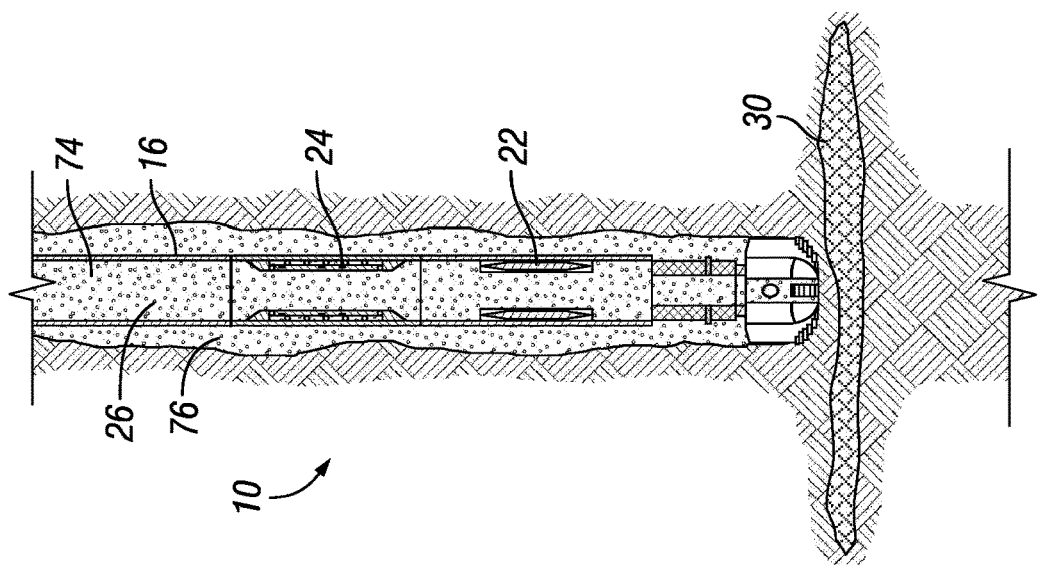
FIG. 8 is a section view of a subterranean well with a system for sealing a lost circulation zone of a subterranean well, in accordance with an embodiment of this disclosure, shown with a drill string drilling a portion of the subterranean well uphole of the lost circulation zone.

In an example of operation, looking at FIG. 8, drill string 16 that includes ultraviolet system 22 and actuator 24 can be used to drill subterranean well 10. As drill string 16 forms subterranean well 10, drilling fluid 74 can be circulated downhole through drill a fluid flow path 26 of drill string 16, can exit through bottom hole assembly 20, and return uphole in the annulus 76 defined between the outer surface of drill string 16 and the inner surface of subterranean well 10. In the example embodiment of FIG. 9, drill string 16 is drilling a portion of subterranean well 10 that is uphole of lost circulation zone 30 and a majority of the drilling fluid is returned through annulus 76 to the surface.

Figure 9:
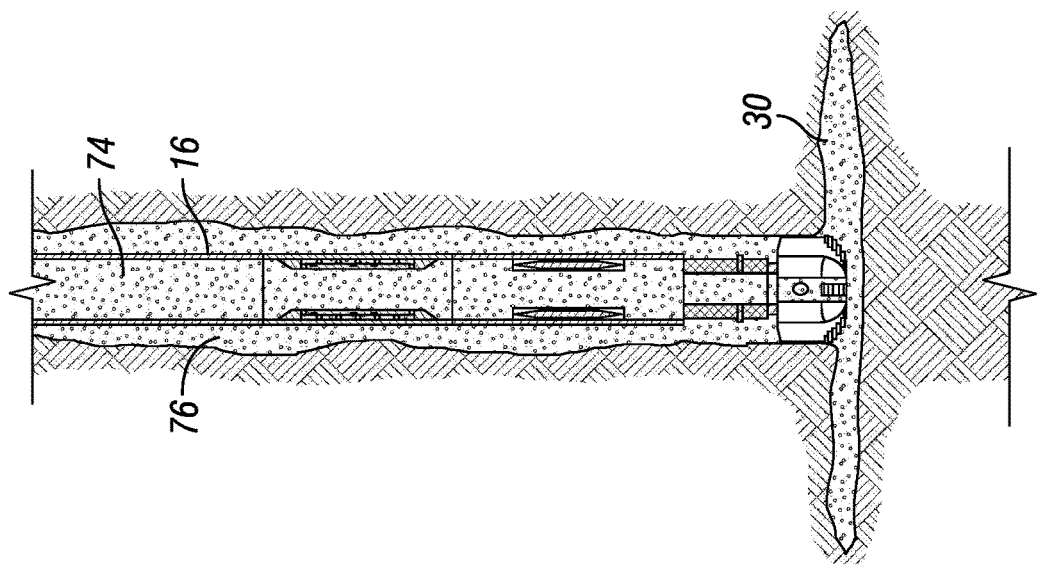
FIG. 9 is a section view of a subterranean well with a system for sealing a lost circulation zone of a subterranean well, in accordance with an embodiment of this disclosure, shown with the drill string drilling into the lost circulation zone.

Looking at FIG. 9, during drilling operations, drill string 16 could encounter lost circulation zone 30. When the downhole end of bottom hole assembly has drilled into lost circulation zone 30, drilling fluid 74 can flow into lost circulation zone 30. Because drilling fluid 74 is flowing into lost circulation zone 30, a lesser portion of drilling fluid 74 is being returned through annulus 76 to the surface. In order to address such a loss of circulation fluid, a loss circulation material can be used to plug lost circulation zone 30.

Figure 10:
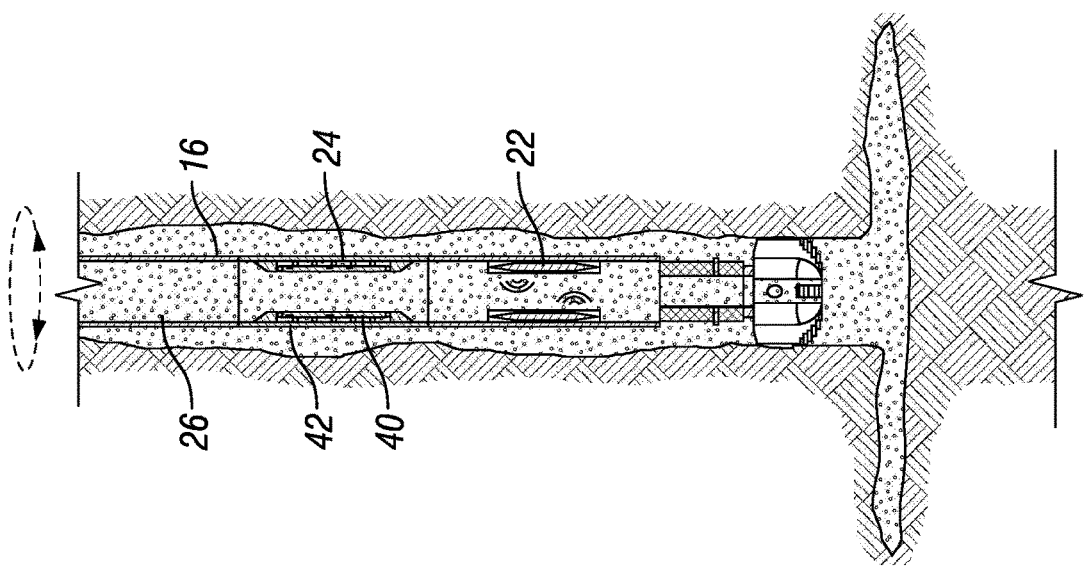
FIG. 10 is a section view of a subterranean well with a system for sealing a lost circulation zone of a subterranean well, in accordance with an embodiment of this disclosure, shown with the drill string being rotated in a pattern to instruct the actuator to transmit the on signal to the ultraviolet system to switch the ultraviolet system to the on condition.

Looking at FIG. 10, before introducing the loss circulation fluid into drill string 16, actuator 24 can be instructed to transmit an on signal to ultraviolet system 22 to switch ultraviolet system 22 to an on condition. In the on condition ultraviolet system 22 generates ultraviolet light directed towards fluid flow path 26 of drill string 16.

In order to provide a predetermined on signal to instruct actuator 24, drill string 16 can be rotated from the surface so that external pipe member 42 rotates relative to internal pipe member 40 in a predetermined pattern. As an example, drill string 16 can be rotated in a specific direction for specific number of times for actuator 24 to generate a unique on signal pattern which is then interpreted by digital logics to turn on battery powered ultraviolet system 22. The digital logics can be coded to respond to one or more unique signal patterns. Actuator 24 can communicate with ultraviolet system 22 wirelessly or through a wired drill pipe.

Figure 11:
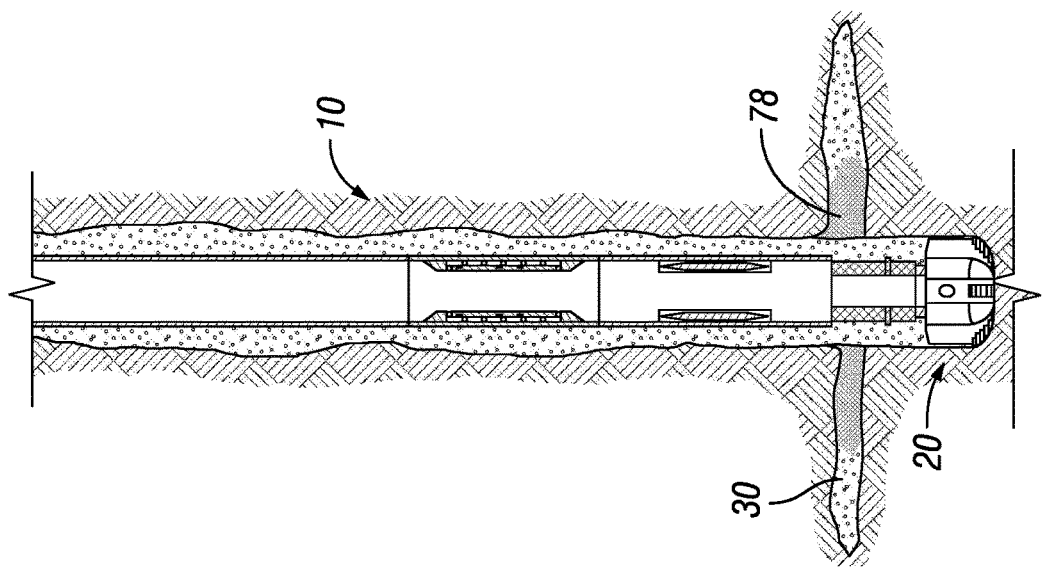
FIG. 11 is a section view of a subterranean well with a system for sealing a lost circulation zone of a subterranean well, in accordance with an embodiment of this disclosure, shown with the ultraviolet system in the on condition and with a loss circulation material being delivered into the fluid flow path of the drill string.

Looking at FIG. 11, after ultraviolet system 22 has been switched to an on condition loss circulation material 64 can be delivered into fluid flow path 26 of drill string 16. As loss circulation material 64 passes through fluid flow path 26 of drill string 16, loss circulation material 64 displaces drilling fluid 74. Drilling fluid 74 can flow through annulus 76 to the surface or can be lost to lost circulation zone 30.

As loss circulation material 64 passes through ultraviolet system 22, loss circulation material 64 is exposed to ultraviolet light that irradiates loss circulation material 64, to generate free-radicals from photo-initiator 70. These free radicals trigger the monomer 68 to undergo a cross-linking or polymerization reaction with oligomer 66 (FIG. 6).

Figure 12:
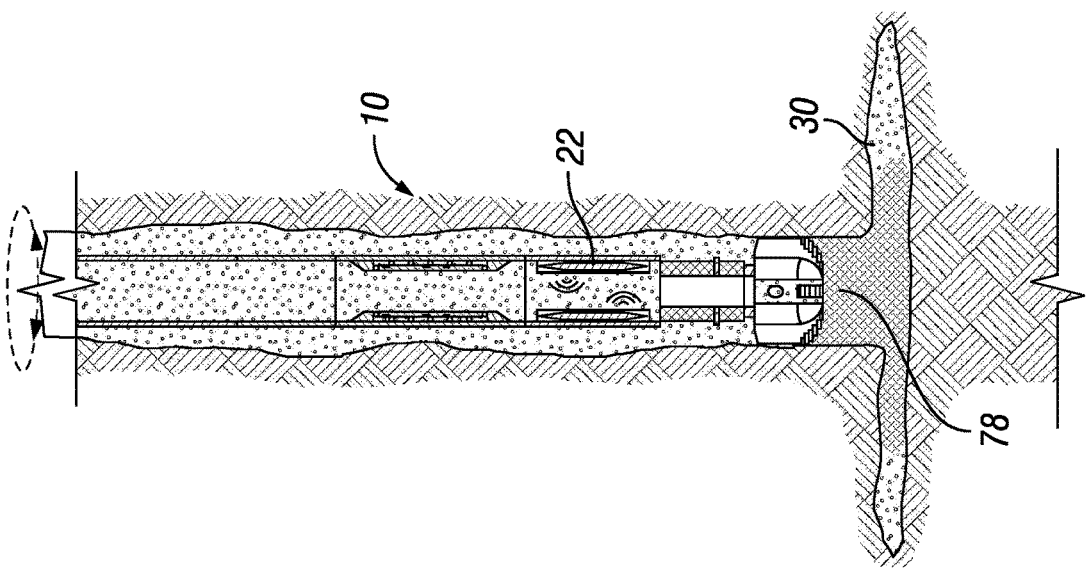
FIG. 12 is a section view of a subterranean well with a system for sealing a lost circulation zone of a subterranean well, in accordance with an embodiment of this disclosure, shown with the drill string being rotated in a pattern to instruct the actuator to transmit the off signal to the ultraviolet system to switch the ultraviolet system to the off condition.

Looking at FIG. 12, drilling fluid 74 can be delivered into fluid flow path 26 of drill string 16 to displace loss circulation material 64. After loss circulation material 64 passes through ultraviolet system 22, loss circulation material 64 is delivered to lost circulation zone 30. Because loss circulation material 64 has been irradiated with ultraviolet light, the resulting cross-linking or polymerization reaction can form cross-linked polymer 78 within lost circulation zone 30. Drilling of subterranean well 10 is ceased until cross-linked polymer 78 has hardened and set within lost circulation zone 30.

After all of loss circulation material has passed through ultraviolet system 22, actuator 24 can be instructed to transmit an off signal to ultraviolet system 22 to switch ultraviolet system 22 to an off condition. In the off condition ultraviolet system 22 does not generate ultraviolet light.

In order to provide a predetermined off signal to actuator 24, drill string 16 can be rotated from the surface so that external pipe member 42 rotates relative to internal pipe member 40 in a predetermined pattern. As an example, drill string 16 can be rotated in a specific direction for specific number of times for actuator 24 to generate a unique off signal pattern which is then interpreted by digital logics to turn on battery powered ultraviolet system 22. The digital logics can be coded to respond to one or more unique signal patterns. Actuator 24 can communicate with ultraviolet system 22 wirelessly or through a wired drill pipe.

Figure 13:
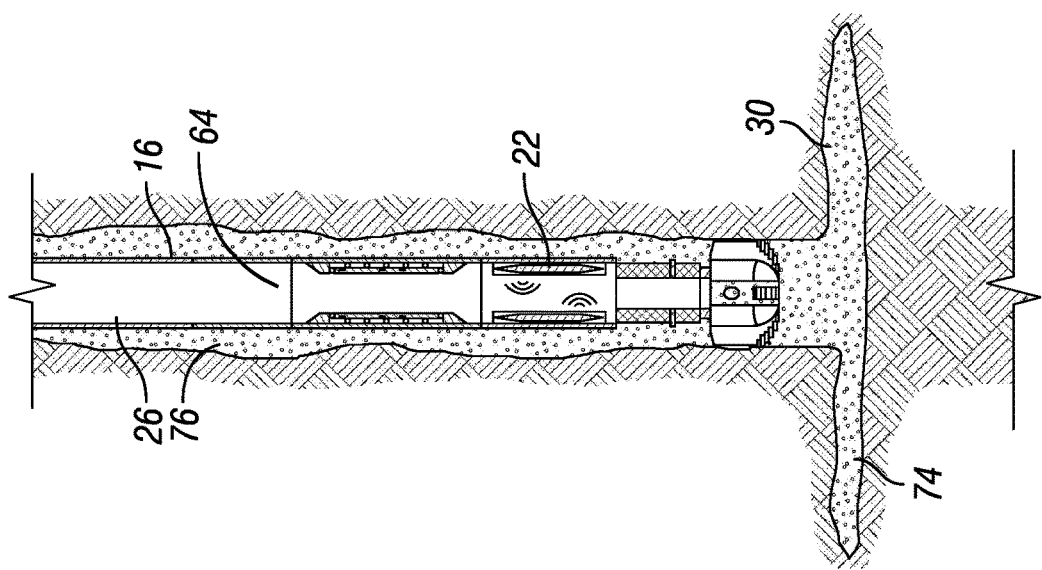
FIG. 13 is a section view of a subterranean well with a system for sealing a lost circulation zone of a subterranean well, in accordance with an embodiment of this disclosure, shown with the drill string drilling through the cross-linked polymer within the lost circulation zone.

Looking at FIG. 13, after cross-linked polymer 78 has hardened and set within lost circulation zone 30, drilling of subterranean well 10 can resume. Drill string 16 can be rotated so that the drill bit assembly of bottom hole assembly 20 continues the drilling of subterranean well 10. The drill bit can drill through cross-linked polymer 72 from a position uphole of lost circulation zone 30 (FIG. 12) to a position downhole of lost circulation zone 30 (FIG. 13) and normal drilling operations can be resumed. The drilling operation and the methods for sealing a lost circulation zone of a subterranean well in accordance with embodiments of this disclosure can be managed through an Industrial Internet of Things (IIoT) platform.

Therefore embodiments of this disclosure provide systems and methods for curing lost circulation that can ensure effective placement and activation of loss circulation material at the loss circulation zone, thereby minimizing or eliminating any error in the placement and activation of the loss circulation material. In embodiments of this disclosure an actuator is located downhole and can be controlled from the surface. The ultraviolet system is placed adjacent to the drill bit and can trigger the polymerization or crosslinking reaction of the loss circulation material. The loss circulation material thickens and hardens in very short period of time and can seal off the fractures or vugs causing lost circulation.

Embodiments described herein, therefore, are well adapted to carry out the objects and attain the ends and advantages mentioned, as well as others inherent therein. While certain embodiments have been described for purposes of disclosure, numerous changes exist in the details of procedures for accomplishing the desired results. These and other similar modifications will readily suggest themselves to those skilled in the art, and are intended to be encompassed within the scope of the present disclosure disclosed herein and the scope of the appended claims.

What is claimed is:

1. A method for sealing a lost circulation zone of a subterranean well, the method including:
    extending a drill string into the subterranean well, the drill string having an ultraviolet system, an actuator, and a fluid flow path;
    instructing the actuator to transmit an on signal to the ultraviolet system to switch the ultraviolet system to an on condition, where in the on condition the ultraviolet system generates ultraviolet light directed towards the fluid flow path of the drill string, where instructing the actuator to transmit the on signal to the ultraviolet system to switch the ultraviolet system to the on condition includes rotating the drill string in a predetermined on signal pattern;
    delivering a loss circulation material into the fluid flow path of the drill string, the loss circulation material having an oligomer, a monomer, and a photo-initiator;
    exposing the loss circulation material to the ultraviolet light to activate the loss circulation material; and
    delivering the loss circulation material to the lost circulation zone.

2. The method of claim 1, further including after exposing the loss circulation material to the ultraviolet light, instructing the actuator to transmit an off signal to the ultraviolet system to switch the ultraviolet system to an off condition by rotating the drill string in a predetermined off signal pattern.

3. The method of claim 1, where the photo-initiator is a benzyl dimethyl acetal, and where exposure to the ultraviolet irradiation by the ultraviolet system causes the benzyl dimethyl acetal to generate a free radical.

4. The method of claim 1, where the oligomer is a polyacrylate and the monomer is a styrene, and where exposure to the ultraviolet irradiation by the ultraviolet system triggers a polymerization reaction of the styrene and the polyacrylate.

5. The method of claim 1, further including forming a cross-linked polymer within the lost circulation zone and ceasing drilling of the subterranean well until the cross-linked polymer has hardened and set within the lost circulation zone.

6. The method of claim 5, further including after the cross-linked polymer has hardened and set within the lost circulation zone, resuming drilling of the subterranean well and drilling from a position uphole of the lost circulation zone to a position downhole of the lost circulation zone.

7. The method of claim 1, where the oligomer is a resin selected from a group consisting of unsaturated polyester resin, acrylated epoxy resin, acrylated polyurethane epoxy resin, acrylated styrene resin, and acrylated ether resin.

8. The method of claim 1, where the ultraviolet system includes a light emitting diode type ultraviolet light source.

9. The method of claim 1, where the actuator is a tubular actuator assembly, and the method includes securing the tubular actuator assembly to a downhole end of a joint of the drill string.

10. The method of claim 9, where the ultraviolet system is a tubular ultraviolet assembly that is located downhole of the tubular actuator assembly, and the method further includes securing a drill bit assembly to a downhole side of the tubular ultraviolet assembly.

11. The method of claim 1, where the actuator is a tubular actuator assembly having:
    an internal pipe member with a segment formed of a first material;
    an external pipe member circumscribing the internal pipe member;
    a bearing positioned between the internal pipe member and the external pipe member, the bearing formed of a second material, where the first material is reactive to the second material; where
    instructing the actuator to transmit the on signal to the ultraviolet system includes rotating the external pipe member relative to the internal pipe member and interpreting a pattern of a reaction of the segment as the bearing rotates past the segment.

12. A system for sealing a lost circulation zone of a subterranean well, the system including:
    a drill string having an ultraviolet system, an actuator, and a fluid flow path;
    the actuator operable to transmit an on signal to the ultraviolet system to switch the ultraviolet system to an on condition, where in the on condition the ultraviolet system generates ultraviolet light directed towards the fluid flow path of the drill string;
    a predetermined on signal pattern defined by rotation of the drill string, the predetermined on signal pattern operable to instruct the actuator to transmit the on signal to the ultraviolet system to switch the ultraviolet system to the on condition; and
    a loss circulation material for delivery into the fluid flow path of the drill string, the loss circulation material having an oligomer, a monomer, and a photo-initiator operable to be activated upon exposure to an ultraviolet irradiation by the ultraviolet system.

13. The system of claim 12, further including a predetermined off signal pattern defined by rotation of the drill string, the predetermined off signal pattern operable to instruct the actuator to transmit an off signal to the ultraviolet system to switch the ultraviolet system to an off condition.

14. The system of claim 12, where the photo-initiator is a benzyl dimethyl acetal that is operable to generate a free radical when exposed to the ultraviolet irradiation by the ultraviolet system.

15. The system of claim 12, where the oligomer is a polyacrylate and the monomer is a styrene, and where exposure to the ultraviolet irradiation by the ultraviolet system is operable to trigger a polymerization reaction of the styrene and the polyacrylate.

16. The system of claim 12, further including a cross-linked polymer set within the lost circulation zone, the cross-linked polymer including the oligomer, and the monomer.

17. The system of claim 12, where the ultraviolet system includes a light emitting diode type ultraviolet light source.

18. The system of claim 12, where the actuator is a tubular actuator assembly secured to a downhole end of a joint of the drill string.

\* \* \* \* \*